United States Patent [19]
Luhman, III

[11] 3,988,400
[45] Oct. 26, 1976

[54] METHOD OF REPAIRING CRACKED WINDSHIELDS

[76] Inventor: Edward F. Luhman, III, 13239 Joy Road, Detroit, Mich. 48228

[22] Filed: Apr. 24, 1975

[21] Appl. No.: 571,707

[52] U.S. Cl. ................................ 264/36; 156/94; 264/259; 264/267; 264/299; 264/319
[51] Int. Cl.² ...................................... B29F 5/00
[58] Field of Search ............ 264/36, 102, 319, 267, 264/259; 156/94, 293

[56] References Cited
UNITED STATES PATENTS

| 3,562,366 | 2/1971 | Sohl | 264/23 |
| 3,765,975 | 10/1973 | Hollingsworth | 264/102 |
| 3,841,932 | 10/1974 | Forler et al. | 156/94 |

*Primary Examiner*—Willard E. Hoag
*Attorney, Agent, or Firm*—Biebel, French & Nauman

[57] ABSTRACT

The invention provides a simple and safe way of repairing a crack occurring in a composite sheet of glass, such as a windshield, which has been struck by a hard object forming a small cone with its apex on the surface and its base against the film sheet which laminates the front and the back panes of glass together.

1 Claim, 3 Drawing Figures

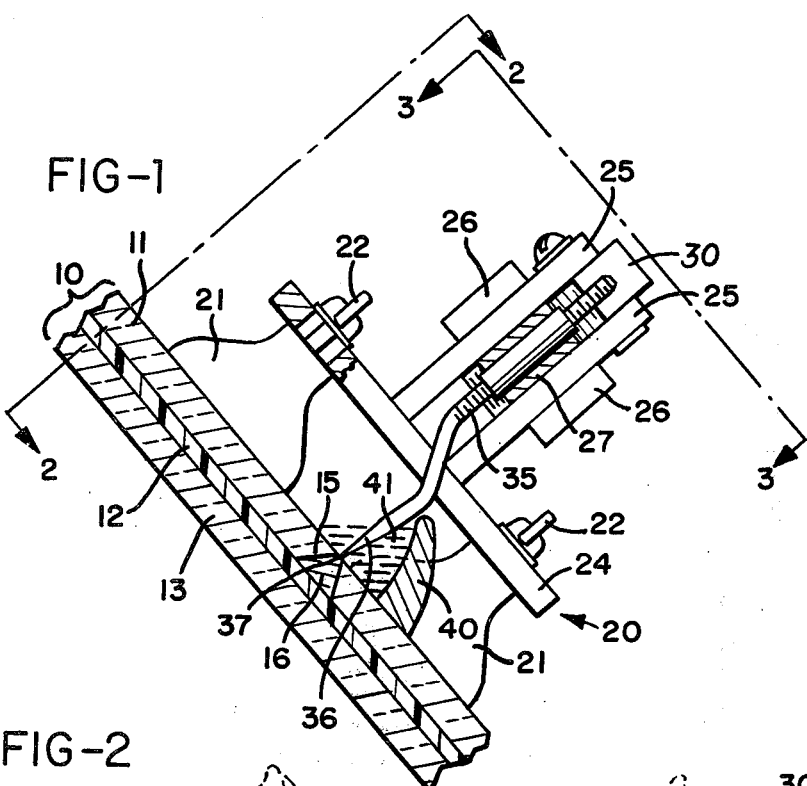
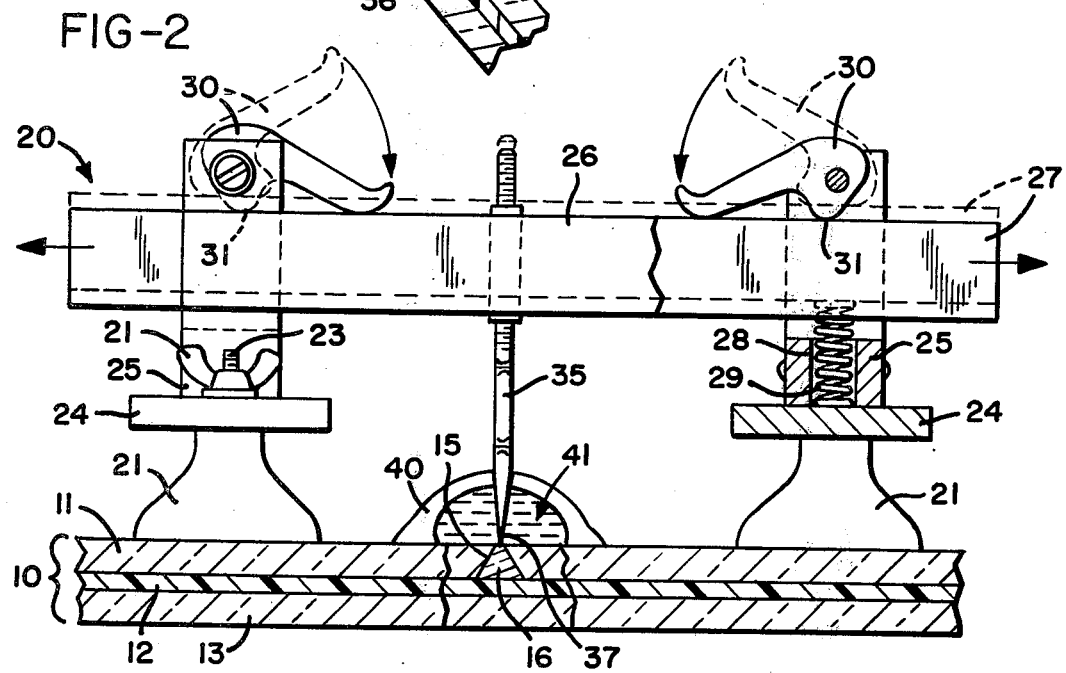
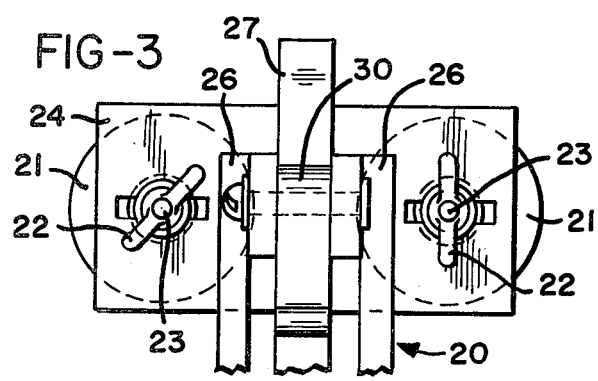

METHOD OF REPAIRING CRACKED WINDSHIELDS

BACKGROUND OF THE INVENTION

Sohl U.S. Pat. No. 3,562,366 shows a method of repairing a composite glass windshield by subjecting the area to supersonic vibration applied in a series of short bursts. Hollingsworth U.S. Pat. No. 3,765,975 also shows a method of repairing such a windshield by applying alternate negative and positive pressures with a maximum pressure not exceeding about 135 psi. Forler et al. U.S. Pat. No. 3,841,932 shows a method of treating a cracked windshield through the use of a hand-held probe by means of which pressure is applied to the apex of the cone in all angular positions and continuously changing directions thereby causing the cone to gyrate.

Referring to Sohl and Hollingsworth, these patents require special apparatus which is expensive and difficult to operate because they largely conceal the point of contact with the cone. Forler et al on the other hand specifies a hand-held probe and that the probe be moved in all angular directions which could thus readily rub against the edges of the crack and cause the same to spread and enlarge.

SUMMARY OF THE INVENTION

The present invention avoids the disadvantages of the prior art and provides for actuating the probe in a single axial direction so that it can be applied to the apex of the cone and moved in a single line to bring pressure to bear on the cone only, while avoiding all undesired contact with the edges of the glass which surround the cone, thereby facilitating the production of a repair using a curable plastic cement having a similar index of refraction to the glass which upon setting becomes practically invisible.

BRIEF DESCRIPTION OF THE DRAWINGS

FIG. 1 is a view in section of a windshield having a crack on its outer face and with the device of the present invention in operative position;

FIG. 2 is a view along the line 2—2 of FIG. 1 with parts being broken away to show the interior construction; and FIG. 3 is a partial view on the line 3—3 of FIG. 1.

DESCRIPTION OF THE PREFERRED EMBODIMENT

Referring to the drawings, the windshield is shown at 10 comprising an outer or forward pane of glass 11, an intermediate laminating film 12 and the inner or rear pane of glass 13. As a result of being impacted by a hard object such as a stone or a BB shot, the front pane of glass has a crack 15 with a broken segment of glass 16 in the form of a cone remaining in position and with its apex appearing on the outside surface of the glass and with its inner larger diameter base resting against the laminating film 12.

The apparatus of this invention includes a frame 20 supported by two pairs of suction cups 21 which can be pressed against the outer face of the windshield to retain the frame in fixed position straddling the crack. Wing nuts 22 act on studs 23 and provide for adjustment in slotted bars 24 so that the frame can be adjusted after the cups have been pressed into operative position. A post 25 is secured to each bar and they support cross arms 26 as part of the frame. Between cross arms 26 is a beam 27 mounted for sliding movement thus making it possible to set the beam in any desired position. Each post 25 contains a recess 28 in which a compression spring 29 is mounted and cams 30 are supported on the upper end of the posts 25 having a nose 31 to cause depression of the cross arms against springs 28. Lifting of the cams to the dotted line position will allow cross arms 26 and beam 27 to move away from the glass under the action of springs 29. Centrally of the beam there is a probe 35 which is threaded thereinto and which has an offset end 36 terminating in a narrow point 37. A flexible dam 40 provides for receiving a plastic cement or adhesive 41 which is filled when it is desired to perform the repair operation. A suitable material for this purpose is that shown in Forler et al Pat. No. 3,841,932.

Through proper adjustments, the point 37 is brought into the precise location to contact the apex of cone 16 and clear of contact with the edges of the crack. Then the cams 30 are repeatedly lifted and lowered to bring the nose 37 of the probe into direct contact with the apex of the cone 16, thereby working air bubbles out of the cement filling the space between the cone and the remainder of the glass pane. This can be done because the movement of the probe is confined to a single line of action toward and away from the cone apex, thus avoiding contact with the edges of the crack which are quite fragile and easily chipped or broken. The offset in the probe 35 provides for clearing the dam 40 and facilitates a clear view of the point of action of the probe. When this has been done the suction cups are pulled away, and the reservoir is removed and the resin or cement is allowed to set. The result is that the crack is not chipped around the edges but the space around the cone is filled with cement and when cured it forms a joint which is practically invisible.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. The method of repairing a generally conical crack in a windshield or the like having front and rear glass panels with an intermediate plastic lamination, the crack having an opening through the front glass panel and a conical plug of glass within the crack having its base resting against said lamination, comprising mounting a frame against the face of said front glass panel, forming a liquid barrier on the face of said front panel below said crack for receiving a curable plastic cement to fill said crack, supporting a pointed probe on said frame and maintaining said probe in a position normal to said windshield and adapted to contact the apex of said cone, and repeatedly applying and releasing pressure on said probe and thereby on the apex of said cone out of contact with the edges of said crack to work air bubbles out of said crack and to completely fill the same with said cement, and thereafter curing said liquid to produce a firmly cemented bond between said cone and the interior of said crack.

* * * * *